(12) United States Patent
Maria

(10) Patent No.: US 6,920,905 B2
(45) Date of Patent: Jul. 26, 2005

(54) INSTALLATION FOR FILLING AND PACKAGING HOLLOW BODIES

(75) Inventor: Jean-Pierre Maria, Chateaudun (FR)

(73) Assignee: Societe Developpement Industriel, Chateaudun (FR)

( * ) Notice: Subject to any disclaimer, the term of this patent is extended or adjusted under 35 U.S.C. 154(b) by 0 days.

(21) Appl. No.: 10/312,519

(22) PCT Filed: Jun. 27, 2001

(86) PCT No.: PCT/FR01/02047

§ 371 (c)(1),
(2), (4) Date: Apr. 16, 2003

(87) PCT Pub. No.: WO02/00544

PCT Pub. Date: Jan. 3, 2002

(65) Prior Publication Data

US 2003/0159753 A1 Aug. 28, 2003

(30) Foreign Application Priority Data

Jun. 27, 2000 (FR) .............................. 00 08244
Jun. 27, 2000 (FR) .............................. 00 08242

(51) Int. Cl.⁷ .............................................. B65B 43/42
(52) U.S. Cl. ..................... 141/168; 141/165; 141/171; 141/372; 198/470.1; 198/803.12
(58) Field of Search ................................ 141/168, 163, 141/165, 171, 172, 173, 177, 180, 372; 198/803.12, 470.1; 53/425, 428, 511, 111 R, 473, 467

(56) References Cited

U.S. PATENT DOCUMENTS 763,174 A * 6/1904 Goebel ..................... 198/803.8
1,934,250 A 11/1933 Wynne ........................ 198/131
3,336,722 A * 8/1967 Van Der Winden ............ 53/426
3,538,997 A 11/1970 Christine ..................... 198/131
4,022,315 A * 5/1977 Hori et al. ................ 198/468.6
4,185,812 A 1/1980 Hall ............................ 269/56
4,483,436 A 11/1984 Krishnakumar et al. .... 198/648
4,684,012 A 8/1987 Feddersen .............. 198/803.01
4,802,571 A * 2/1989 Born et al. .............. 198/626.1
4,807,421 A * 2/1989 Araki et al. ................... 53/167
6,341,630 B2 * 1/2002 Reinecke ..................... 141/168

FOREIGN PATENT DOCUMENTS

| DE | 1030211 | 4/1955 |
| EP | 0209064 A | 1/1987 |
| EP | 0291674 A | 11/1988 |
| GB | 969084 A | 9/1964 |

* cited by examiner

Primary Examiner—Khoa D. Huynh
(74) Attorney, Agent, or Firm—Ladas & Parry LLP

(57) ABSTRACT

The invention concerns an installation for filling and packaging hollow bodies (12) comprising stations (20, 22, 24, 26) for filling and packaging said bodies and a device for transferring the latter between an intake station (18) for the bodies in the transfer device, the filling and packaging stations, and an outlet station (19) for the filled and packaged bodies, the transfer device comprising a motorised endless conveyor (16) including an outgoing side (32) opposite which are arranged the filling and conditioning stations and the outlet station (19), and a return side (34). The return side (34) extends above the outgoing side (32). The invention is useful in particular for filling and packaging bottles or flasks.

10 Claims, 6 Drawing Sheets

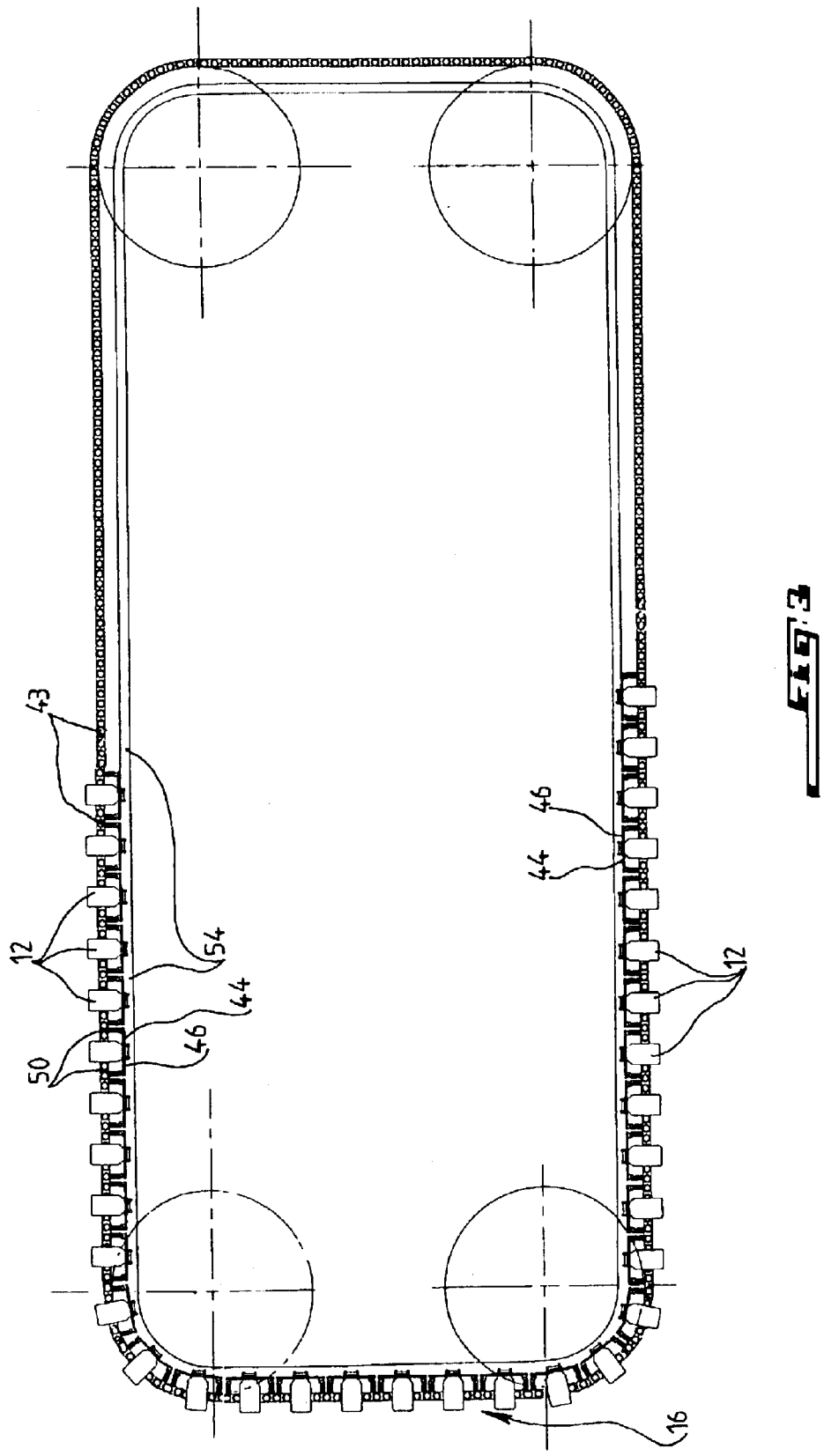

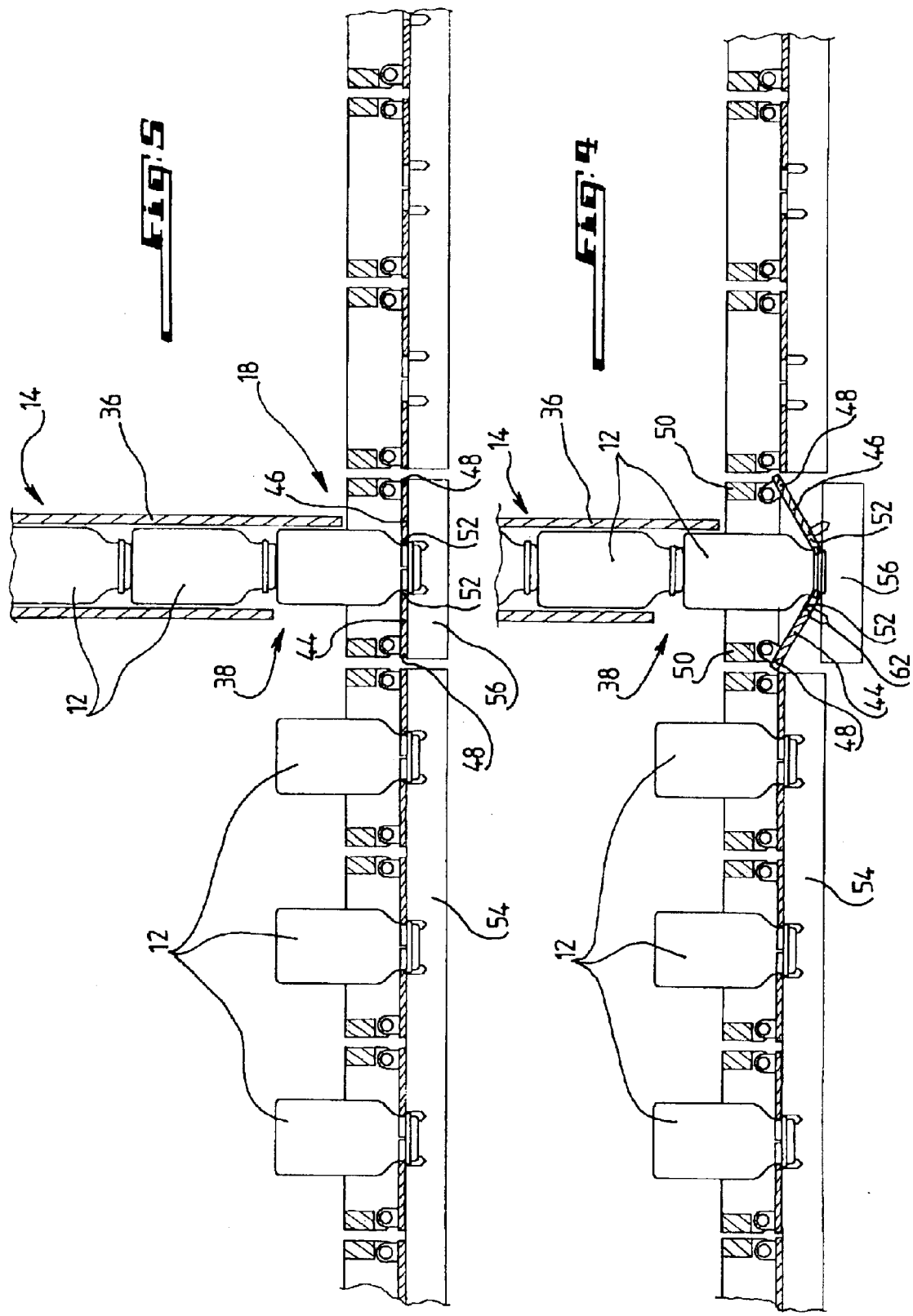

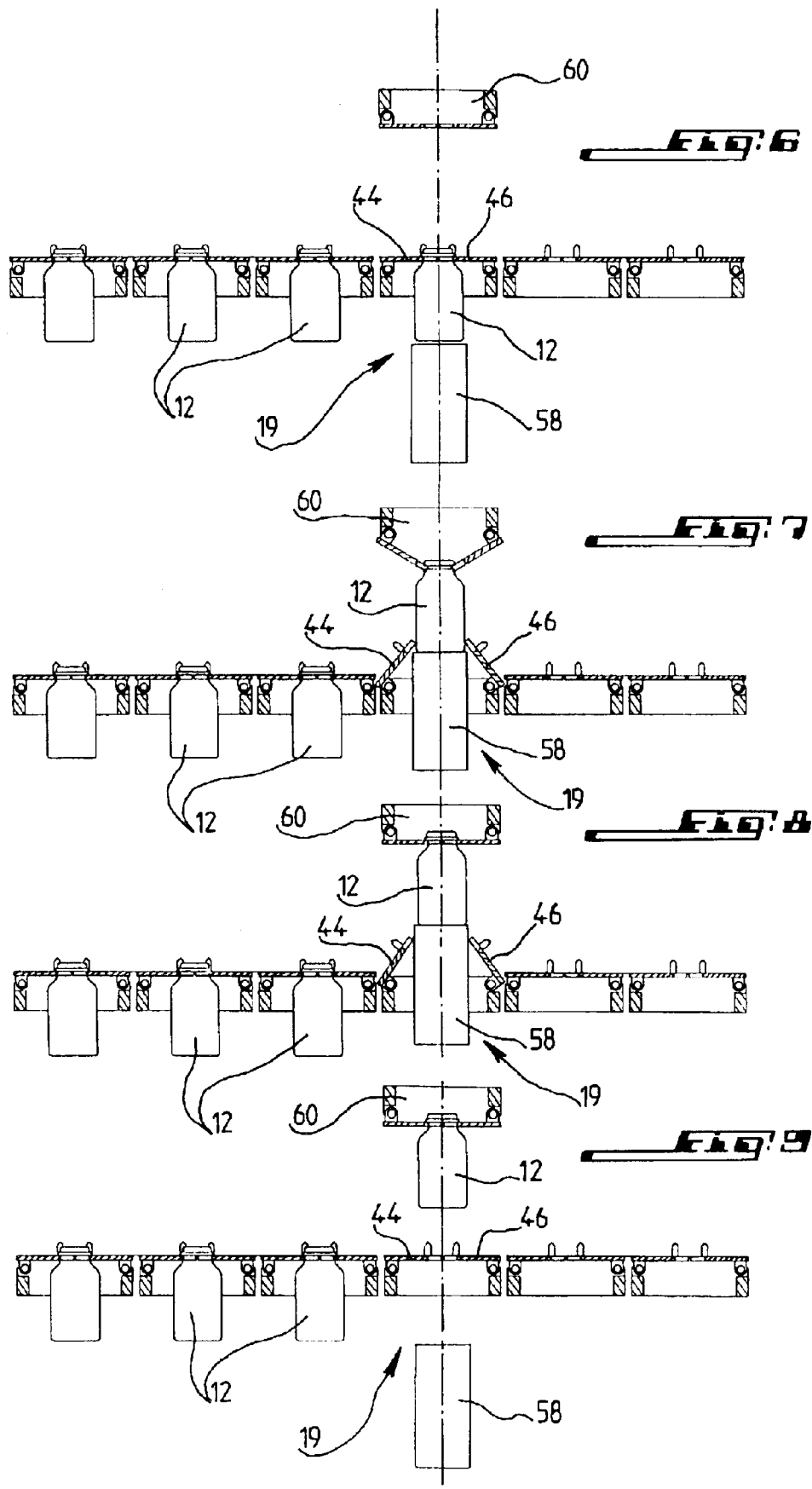

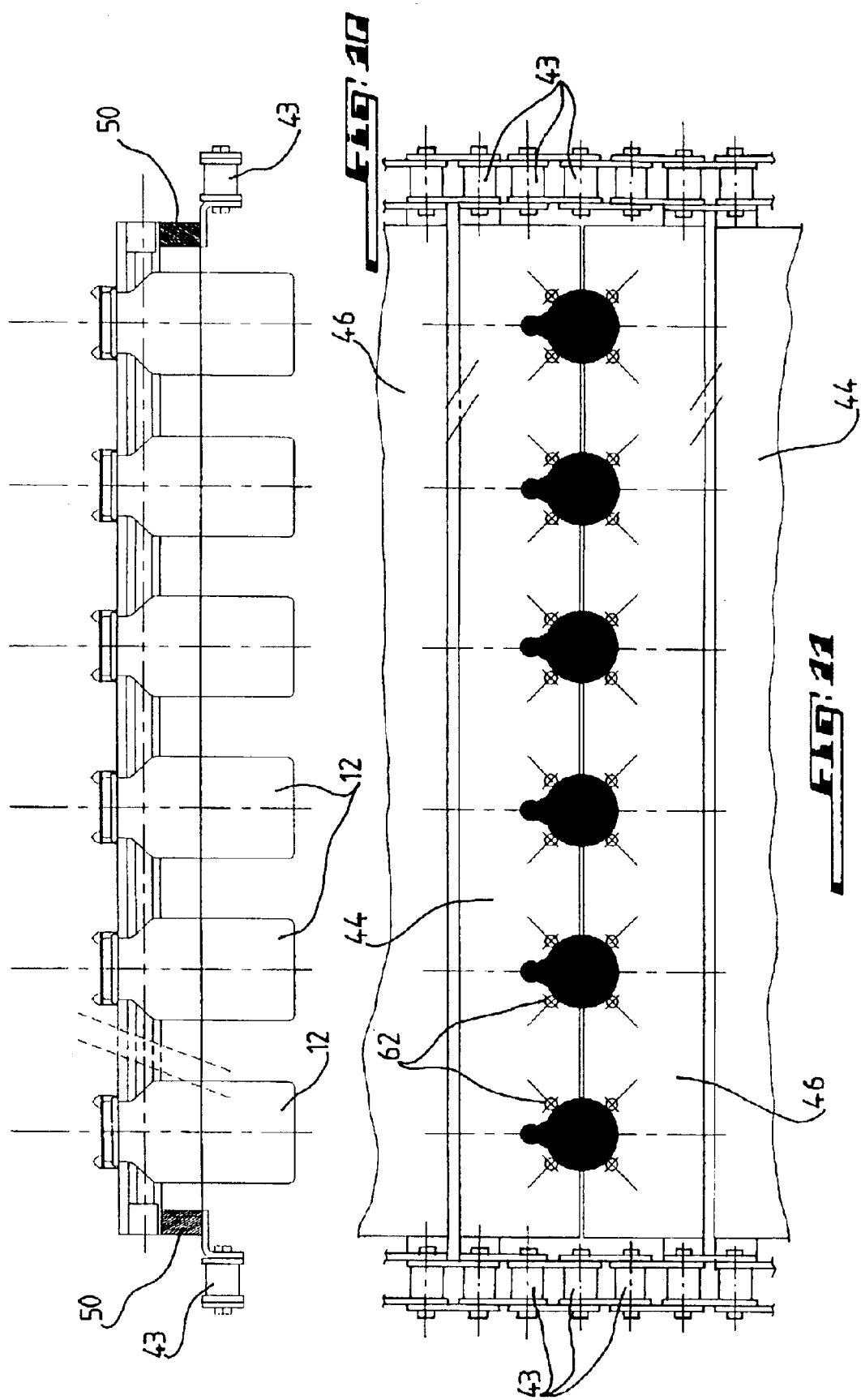

INSTALLATION FOR FILLING AND PACKAGING HOLLOW BODIES

This invention concerns an installation for filling and packaging hollow bodies, in particular hollow bodies with an open end forming a neck, notably on flasks and bottles.

An installation of this type generally contains actual filling and packaging stations and a device for transfer of the bodies between an inlet station for the bodies in the transfer device, the filling and packaging stations and a station for outlet of the filled and packaged bodies.

The transfer device often consists of a motor-driven endless conveyor comprising an outgoing side opposite which are arranged the filling and packaging stations and the outlet station and an incoming side.

It is standard for the outgoing side to constitute the upper side of the conveyor, the incoming side extending parallel under the outgoing side.

According to that arrangement, the inlet station, the filling and packaging station and the outlet station for the filled and packaged bodies are placed opposite the upper side, the incoming side being inoperative.

Thus, when it is desired to increase the number of treatment stations, it is necessary to lengthen the upper side so as to increase the useful length of the conveyors sufficiently to arrange the treatment stations.

The general overall size of the installation is thus increased.

The object of the invention is to overcome that disadvantage and to provide a hollow body filling and packaging installation of reduced dimensions.

It therefore concerns an installation of the aforesaid type, characterized in that the incoming side extends above the outgoing side.

Hence, the incoming side is used for receiving bodies, which makes it possible to reduce the length of the outgoing side accordingly.

The filling and packaging installation according to the invention can also comprise one or more of the following characteristics, taken alone or in all the technically possible combinations:

the inlet station is placed on the path of the incoming side;

the inlet station being placed above the incoming side, and the bodies each being provided with an open end forming a neck, the inlet station is adapted to present the bodies by their necks turned toward the conveyor, the latter being equipped with means of gripping the bodies in that position;

an additional station for treatment of the bodies in empty state is placed opposite the incoming side, downstream from the inlet station, considering the direction of progression of the conveyor;

the conveyor contains feed rolls, at least one of which is the drive roll, these rolls being arranged in pairs, each provided at one end of the sides and thus constituting a brace between the outgoing and incoming sides between which at least one part of said stations is placed;

the additional treatment station is a body disinfecting station;

a conveyor washing station is placed downstream from the outlet station and upstream from the inlet station;

the gripping means contain a plurality of pairs of gripping flaps, the flaps of each pair being adapted to seize together the neck of a body and being mounted pivoting on a drive member of the conveyor, between a closed position in which they are brought close to each other and an open position in which they are separated from each other, the flaps of each pair being provided with respective opposite gripping edges with respective complementary cutouts delimiting, in closed position, at least one neck gripping opening;

each cutout has a semicircular shape of dimensions suited to delimiting, in closed position, together with the cutout of a corresponding flap, a circular gripping opening of dimensions less than those of a ring surrounding the end section of each neck;

each flap is mounted freely turning on a support integral with the drive member, a lug holding the flaps in closed position on which abut the flaps of the incoming side extending longitudinally along a lower face of the incoming side;

the inlet station for the articles contains means of control of opening of the flaps, comprising a base movably mounted in relation to the incoming side between a high opening position of the flaps to allow passage of one or more necks between the flaps and a low closing position of the latter for the gripping of said neck or necks;

the outlet station contains at least one piston displaceably mounted relative to the outgoing side between a low standby position and a high position for lifting a body and opening the flaps in which the body is seized by a gripping device.

Other characteristics and advantages will emerge from the following description, given solely by way of example, and with reference to the attached drawings on which:

FIG. 3 is a detailed view on a larger scale of the conveyor of the installation of FIG. 1;

FIG. 4 is a detailed view on a larger scale of the inlet station of the conveyor of FIG. 3, showing the gripping flaps in open position;

FIG. 5 shows the conveyor of FIG. 4 in closed position of the gripping flaps;

FIGS. 6, 7, 8 and 9 illustrate schematically the structure and operation of the outlet station of the transfer device;

FIG. 10 is a cutaway view along line X—X of the conveyor of FIG. 3; and

FIG. 11 is a top view of a portion of the conveyor of FIG. 3.

Figure 1:
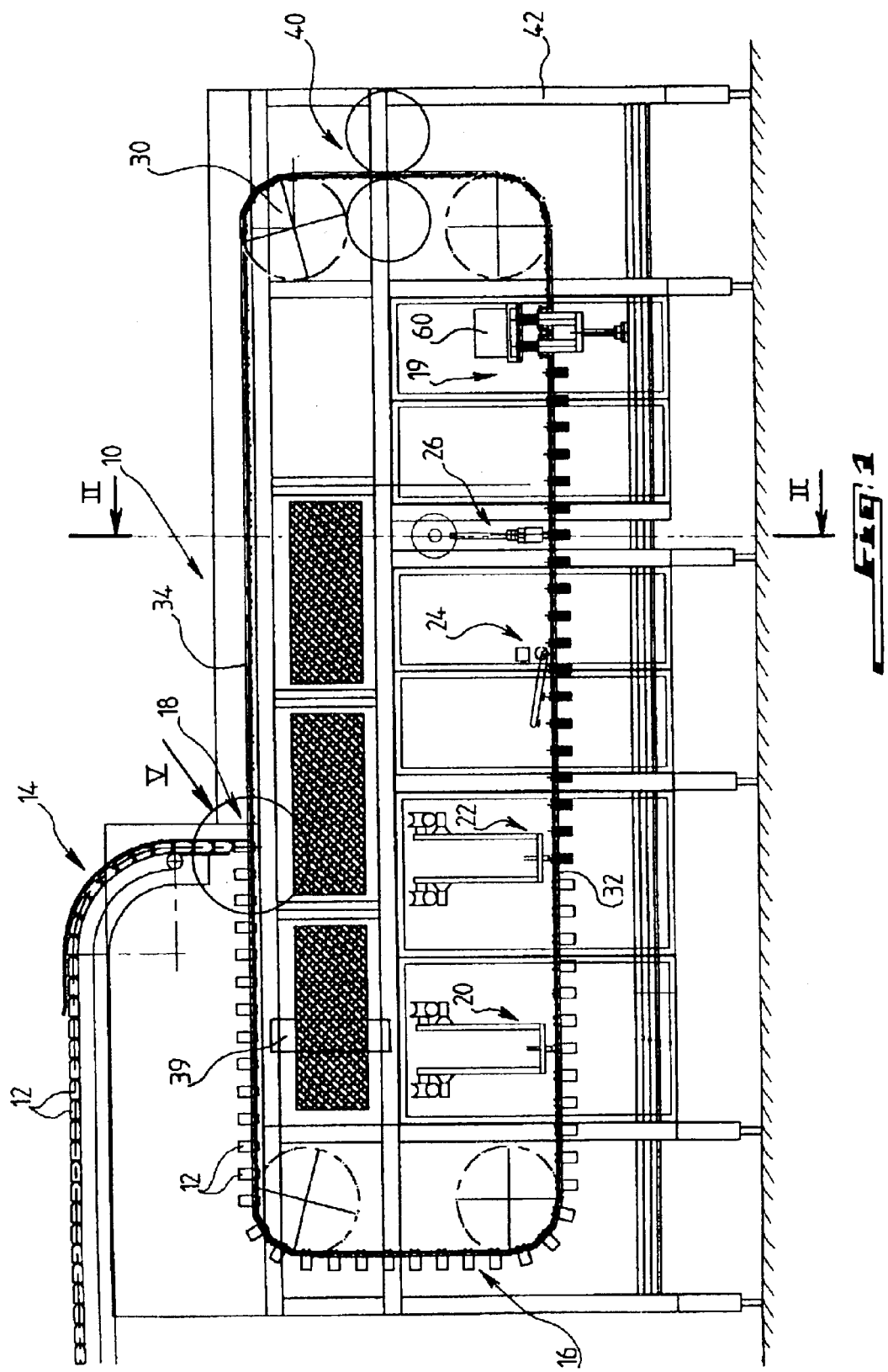
FIG. 1 is a schematic side view of a bottle filling and packaging installation according to the invention.

On FIG. 1 a hollow body filling and packaging installation is schematically represented, designated by general numerical reference 10.

It is intended for filling and packaging bottles, such as 12, continuously supplied and entering the installation 10 through an appropriate feed device 14.

The installation 10 contains bottle filling and packaging stations and a transfer device, consisting of a motor-driven endless conveyor 16, ensuring transfer of the bottles 12 from a bottle inlet station 18 in the conveyor to the bottle filling and packaging stations, and then to a bottle outlet station 19 of the installation 10.

For example, the stations comprise stations 20 and 22 for proportioning products and filling bottles and stations 24 and 26 for closing the filled bottles by deposit of a cap on the neck of each bottle.

Figure 2:
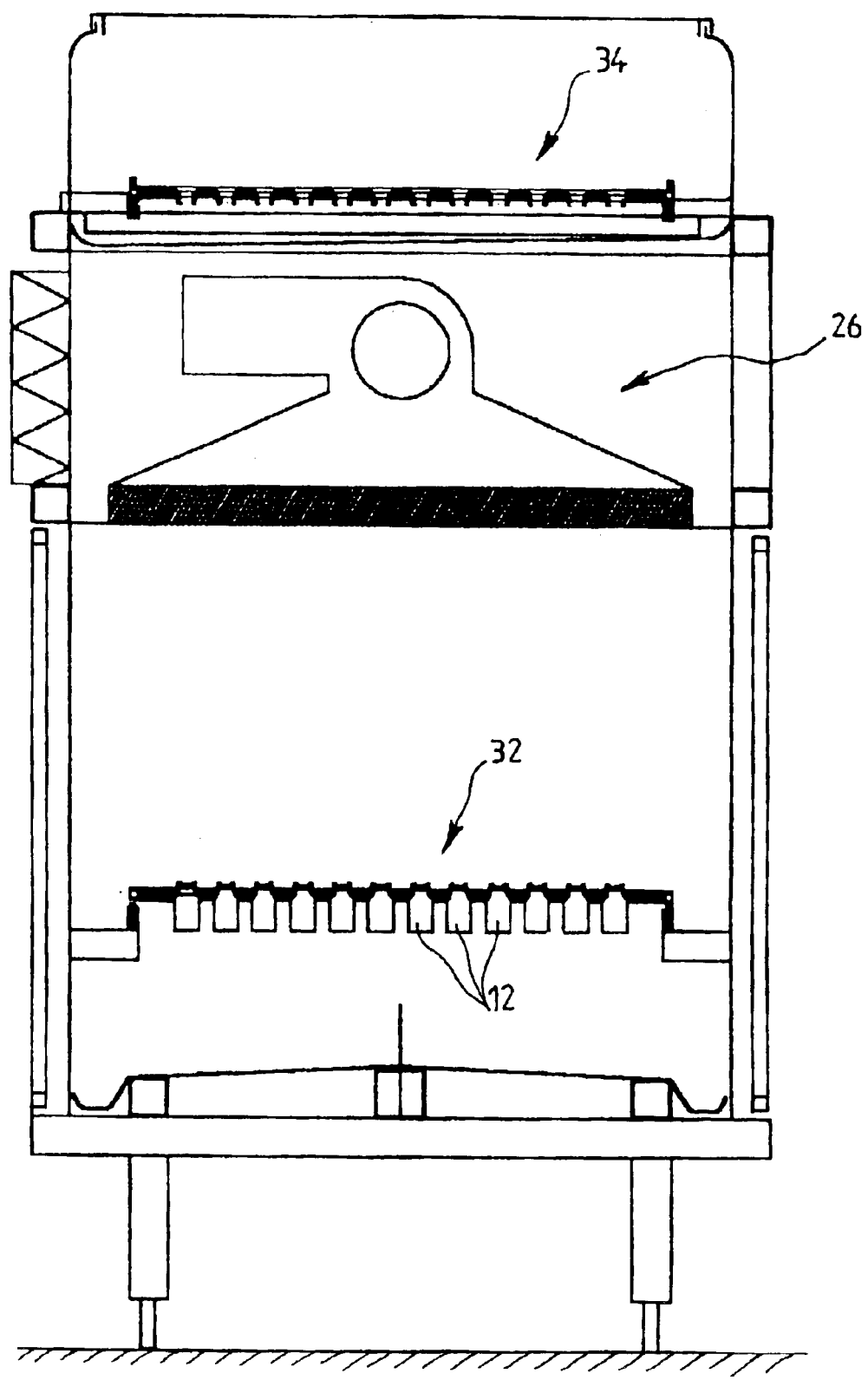
FIG. 2 is a cutaway view along line II—II and, on a larger scale, of the installation of FIG. 1.

Referring also to FIGS. 2 and 3, the conveyor 16 is combined with feed rolls, such as 30, at least one of which is the drive roll and contains a lower outgoing side 32 ensuring transfer of the bottles between the filling and packaging stations up to the outlet station 19 and an upper incoming side 34 extending over the outgoing side and on the path of which the bottle inlet station 18 is placed.

The installation 10 contains two pairs of feed rolls 30, each placed at one of the ends of the sides 32 and 34, the rolls of each pair being placed over each other so as to form a brace creating enough space in the conveyor 34 for installation of the filling and packaging stations.

As will be described in detail below, the rolls are driven by a step motor on which the stations of the installation are synchronized.

As can also be seen on FIGS. 4 to 5, the feed device 14 mainly consists of a feed pipe 36 in which the bottles 12 are filled, so that the bottles 12 are presented entering the inlet station 18 with their necks turned toward the conveyor 16.

The wall portion of the feed pipe 36, turned toward the downstream side of the conveyor, considering the direction of progression of the latter, is provided with a cutout 38 shaped to allow passage of the bottles 12 after they are taken over by the conveyor.

Referring again to FIG. 1, downstream from the inlet station 18, considering the direction of progression of the conveyor 16, and upstream from the outgoing side 32, the installation 10 is equipped with one or more additional treatment stations, only one of which, designated by reference 39, has been schematically represented, at the level of the bottle or bottles 10 undergoing a specific operation, such as, for example, a disinfection.

Preferably, in order to reduce the general overall size of the installation, the additional stations are placed between the outgoing and incoming sides.

Finally, downstream from the outgoing side and upstream from the incoming side, that is, between the feed rolls of one of the pairs of rolls, the installation 10 is provided with a supplementary station 40 for washing the conveyor 16.

An additional treatment station could, of course, also be provided, if need be, between the feed rolls and the other pair of rolls, that is, upstream from the outgoing side 32 and downstream from the incoming side 34.

The unit is supported by a frame 42 consisting of an assembly of metal sections and is encased by a set of metal sheets fastened on the frame 42.

The conveyor 16 contains a chain 43 consisting of a set of articulated links and is equipped with means for gripping the bottles, comprising a plurality of gripping cells juxtaposed in the direction of progression of the conveyor.

As can be seen on FIGS. 4 and 5, each gripping cell consists of first and second gripping flaps, such as 44 and 46, each containing a first side edge 48, upstream and downstream respectively, mounted pivoting on a support 50 articulated on the chain 43 between an open position, visible on FIG. 4, in which the flaps 44 and 46 are separated from each other to allow passage of the necks of the bottles, and a closed position, visible on FIG. 5, in which the flaps 44 and 46 are brought together and delimit in pairs an opening for gripping the neck of each bottle 12.

in face, each flap 44 and 46 contains a second side edge, downstream and upstream respectively, extending opposite the side edge 48 by which it is articulated on the support 50. The second side edge 52 present a cutout so as to delimit, in closed state, a generally cylindrical opening of general dimensions less than those of a peripheral flange surrounding the end section of each bottle neck.

The flaps 44 and 46 are mounted in free rotation on the support 50.

Thus, the bottles 12, bearing by their peripheral flange on the flaps 44 and 46 of the gripping cells of the outgoing side 32, force the latter into closed position.

On the other hand, the flaps of the gripping cells of the incoming side 34 bear on a longitudinal fixed guide 54 integral with the frame 42 of the installation 10 and extending, notably, along the lower face of the incoming side of the conveyor in order to maintain the flaps in closed position.

Finally, the inlet station 18 is equipped with a control member for opening the flaps 44 and 46, containing a base 56 combined with appropriate lifting means such as a pneumatic jack (not represented). The base 56 is movably mounted relative to the flaps under the control of the lifting means between a low position, visible on FIG. 4, in which the flaps 44 and 46 are free to move downward, in the direction of opening of the latter under the effect of the weight of a bottle, thus allowing the positioning of the neck of that bottle 12 opposite the cutouts of the flaps 44 and 46, and a high position, visible on FIG. 5, in which it brings about the complete closing of the flaps 44 and 46 and gripping of the neck of a bottle.

The movement of the base 56 is cyclic and is synchronized on the step-by-step movement of the conveyor and the conveyance of the bottles, so that on each return of the base to high position, the conveyor is moved by an increment and then lowered again.

In high position the upper surface of the base 56 is flush with the upper surface of the guide 54.

Thus, a progression of the conveyor produces the downstream movement of a gripping cell from the inlet station to a position in which the flaps 44 and 46 rest on the guide 54, and in which an adjacent gripping cell is positioned opposite the inlet station 18.

Referring now to FIGS. 6 to 9, as for the outlet station, it contains two pistons 58, mounted axially displaceable under the action of lifting means between a low rest position, visible on FIGS. 6 and 7, and a high active position, represented on FIGS. 7 and 8. On those figures only one piston has been represented. The pistons 58 are rated according to the movement of the conveyor 16 and are spaced longitudinally by a distance corresponding to the distance separating two adjacent gripping cells.

Of course, depending on the rate desired, a single piston 58 can be used.

On each return of the pistons to low position, the conveyor is moved by one increment. On their displacement from the low piston to the high position, the pistons 58 each produce a consecutive movement of the bottle 12 to a high position, in which the neck o(f that bottle comes opposite the jaws of a gripping device 60.

The operation of the outlet station 19 is going to be described below, with reference to the operation of a single piston 58.

When a bottle 12 is positioned on the axis of the piston 58 (FIG. 6), the piston 58 is actuated by the lifting means from its low position to its high position until the neck of the bottle 12 comes opposite the jaws of the gripping device 60 (FIGS. 7 and 8). In that position the bottom of the bottle is released from the flaps resting on the piston 58.

Following that movement, the jaws of the gripping device are reclosed and seize the neck of the bottle.

The piston 58 is then repositioned in its low rest position and, in the course of that displacement, accompanies the repositioning of the flaps in closed position (FIG. 9). The bottle can then be transferred to a further treatment chain.

It will be noted that, to assist the movement of the flaps in closed position, it is possible to provide on the upper end of the piston inclined guide vanes receiving the flaps in high position and guiding the latter on descent of the piston.

In the description of the installation just given, it was considered that the gripping cells are only suited to seize one single bottle each.

Of course, as a variant and as represented on FIGS. 10 and 11, with a view to increasing the pace of manufacture, a plurality of cutouts is provided on each flap of each gripping cell, evenly distributed crosswise to the direction of propagation of the conveyor and delimiting, with corresponding cutouts machined in the matching flap, a set of gripping openings for the simultaneous gripping of a number of bottles corresponding to the number of openings thus machined. The feed device 14, the base of the inlet station 18, the piston of the outlet station 19 and the gripping device 60 are, of course, arranged accordingly.

Finally, it will be noted, as shown on FIG. 11, that each flap can be further equipped with slugs, such as 62, numbering four per bottle, for example, making possible easy closing of the neck of the bottle at closing stations 24 and 26, allowing precise centering of the caps delivered by those stations on the neck.

It is understood that the invention just described, which uses a conveyor provided with an incoming side extending above the outgoing side, can afford reduced overall dimensions, insofar as at least a part of that incoming side can be used to receive the bottles and to proceed with treatment of the latter.

What is claimed:

1. An installation for filling and packaging hollow bodies, comprising at least one filling and packaging station (20, 22, 24, 26) for filling and packaging hollow bodies (12), and a transfer device for transfer of the hollow bodies between an inlet station (18) for the hollow bodies in the transfer device and an outlet station (19) for the hollow bodies filled and packaged, passing through the filling and packaging station (20, 22, 24, 26), the transfer device containing a motor-driven endless conveyor (16) comprising an outgoing side (32), opposite which is arranged the filling and packaging station and the outlet station, and an incoming side (34)

characterized in that the incoming side (34) extends over the outgoing side (32), the hollow bodies respectively have open ends forming necks, the inlet station is adapted to present the hollow bodies in positions with the necks turned toward the conveyor, the conveyor being equipped with gripping means (44, 46) for gripping the hollow bodies in the positions, the gripping means contain a plurality of pairs of gripping flaps (44, 46), the pairs of gripping flaps being adapted for seizing together respective necks and being mounted on a drive number (43) of the conveyor for pivoting the gripping flaps between an active position in which the gripping flaps are brought close to each other for the seizing and an open position in which the gripping flaps are separated from each other, the gripping flaps (44, 46) of each of the pairs being provided with respective opposite gripping edges with respective complementary cutouts together delimiting, in the active position, at least one neck gripping opening, and each at the gripping flaps (44, 46) is mounted freely turning on a support (50) of the drive member (43) and in that the support contains a lug (54) holding the gripping flaps in the active position, the jug extending longitudinally along a lower face of the incoming side (34) and on which the gripping flaps rest.

2. Installation according to claim 1, characterized in that the inlet station (18) is placed on a path to the incoming side.

3. Installation according to claim 1, characterized in that it further contains an additional station (39) for treatment of the hollow bodies in an empty state, the additional station being opposite the incoming side (34), downstream from the inlet station (18), considering a direction of progression of the conveyor.

4. Installation according to claim 1, characterize in that the conveyor contains feed rolls (3), at least one of which is a drive roll, the feed rolls (30) being arranged in pairs for constituting braces between the outgoing side (32) and the incoming side (34).

5. Installation according to claim 3, characterized in that the additional station (39) is a body disinfecting station.

6. Installation according to claim 1, characterized in that it further contains a conveyor washing station (4) placed downstream from the outlet station (19) and upstream from the inlet station (18) considering a direction of progression of the conveyor.

7. Installation according to claim 1, characterized in that each of the cutouts has a semicircular shape of dimensions for the delimiting in the active position of the neck gripping opening as a circle for dimensions less than those of a ring surrounding an end section of each of the necks.

8. Installation according to claim 1, characterized by means for opening the gripping flaps to the open position comprising a base (56) movably mounted in relation to the incoming side (34) between a high opening position of the gripping flaps (44, 46) to allow passage of at least one of the necks between the gripping flaps and a low closing position of the flaps for the gripping of the necks in the active position.

9. Installation according to claim 1, characterized in that the outlet station contains at least on piston (58) displaceable mounted relative to the outgoing side (32) between a low standby position and a high position for lifting the hollow bodies (12).

10. Installation according to claim 1, wherein
the inlet station (18) is placed above the incoming side (34).

* * * * *